May 29, 1956 — L. F. SWEEM — 2,747,387
DOUBLE CUP
Filed Feb. 6, 1953

INVENTOR
Leo F. Sweem
BY
ATTORNEYS

# 2,747,387

DOUBLE CUP

Leo F. Sweem, Sacramento, Calif., assignor of one-half to Harry H. Hart, Sacramento, Calif.

Application February 6, 1953, Serial No. 335,575

1 Claim. (Cl. 65—13)

This invention relates generally to improvements in drinking cups, particularly of earthenware type as used in restaurants.

In particular, the invention is directed to—and it is a major object to provide—a novel coffee cup of a size and configuration for use—as in a restaurant—to serve a double portion of coffee to a patron.

Another object of the present invention is to provide an integral, double coffee cup which is formed to give the appearance of two regular cups stacked one on top of the other, yet with a single handle connected between the upper cup body and lower cup body in such relation thereto that proper balance is obtained for ease and convenience of handling the cup.

An additional object of the invention is to provide a double coffee cup, as above, which is constructed in a manner to include a strong line of juncture or annular merging between the upper cup body and the lower cup body; the cup at the line of juncture being of a thickness substantially equal to that of the walls of said cup bodies, whereby fracturing along said line is not likely to occur upon relatively rough handling of the cup, as in restaurant dishwashing operations.

It is also an object of the invention to provide a double coffee cup which is designed for ease and economy of manufacture.

Still another object of the invention is to provide a practical and durable coffee cup, and one which will be exceedingly effective for the purpose for which it is designed.

These objects are accomplished by means of such structure and relative arrangement of parts as will fully appear by a perusal of the following specification and claim.

Figure 1:
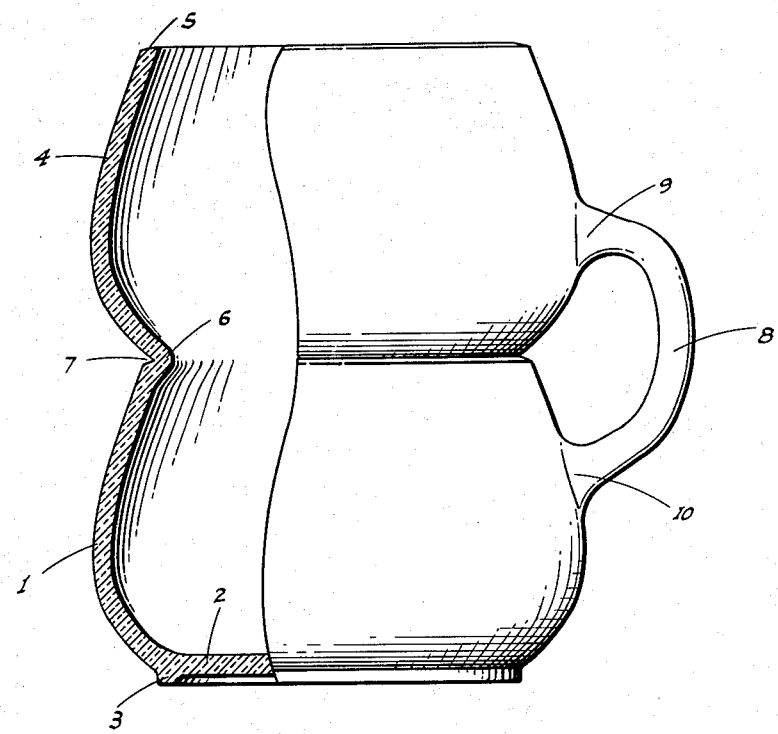
Fig. 1 is a side elevation, partly in section, of the cup.
Figure 2:
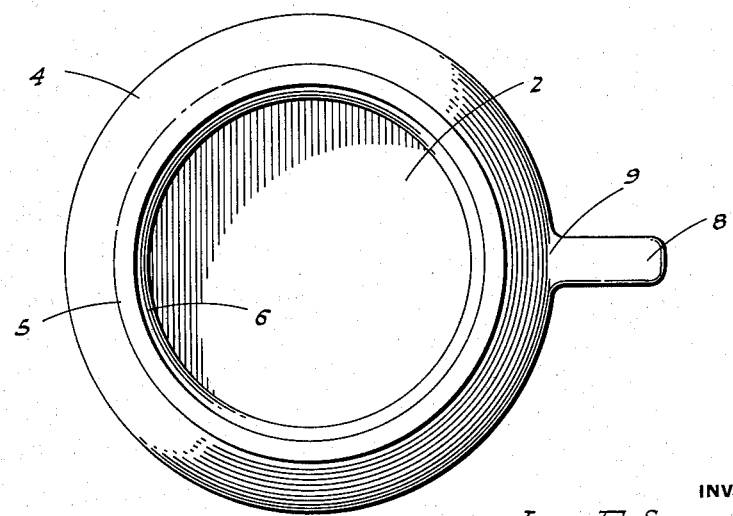
Fig. 2 is a plan view of the same.

Referring now more particularly to the characters of reference on the drawings, the cup comprises a lower cup body 1 having a closed bottom 2, with an annular base or foot 3 projecting a short distance downwardly from such bottom for seating of the cup on a saucer.

A bottomless, upper cup body 4 is disposed symmetrically above the lower cup body 1; such upper cup body 4 having an annular top rim 5.

The cup bodies 1 and 4 are bellied outwardly intermediate their ends, as shown, and at adjacent ends said bodies merge in integral relation; the annular line of juncture or merging being in the form of a narrow groove as indicated at 6, and at such line the wall thickness is substantially equal to the thickness of the walls of said bodies 1 and 4. This is advantageous for the reason that it minimizes the likelihood of the cup bodies 1 and 4 fracturing apart at said line of juncture 6 due to rough handling, as during restaurant dishwashing operations.

Radially outwardly of the annular line of juncture or groove 6 the lower cup body 1 is formed, at its upper end or at the lower side of said groove as an extension thereof, with an exposed annular top ledge 7; the purpose of such top ledge 7 being to give the visual impression that the upper cup body 4 is merely seated or nested on the lower cup body 1. In other words, the ledge 7 gives the effect of one cup being stacked on another.

On one side thereof the cup includes an upstanding, outwardly projecting C-shaped handle 8, such handle merging in integral relation at its upper end, as at 9, with the upper cup body 4 intermediate the ends of the latter, and said handle merging at its lower end, as at 10, with the lower cup body 1 intermediate the ends of the same. With this arrangement of the handle 8, nicety of balance of the cup is attained when a person grasps the handle for the purpose of lifting and drinking from the cup. Additionally, by connecting the handle 8 between the lower cup body 1 and upper cup body 4, further strengthening of the connection between said cup bodies is accomplished.

With the described novel coffee cup, a double portion of coffee is served to the patron, avoiding the necessity of replenishing the supply for those patrons who desire more than one cup of coffee with a meal. Not only is this a convenience to the patron, but it provides a novelty which has advertising advantage, particularly in restaurants of self-serve or cafeteria type.

From the foregoing description it will be readily seen that there has been provided such an article of manufacture as will substantially fulfill the objects of the invention, as set forth herein.

While this specification sets forth in detail the present and preferred construction of the article of manufacture, still in practice such deviations therefrom may be resorted to as do not form a departure from the spirit of the invention, as defined by the appended claim.

Having thus described the invention, the following is claimed as new and useful, and upon which Letters Patent are desired:

An integral double drinking cup unit including a lower cup body having a bottom and a bellied side wall, and defined at its upper end by a flat upwardly sloping and radially narrow annular ledge, and a bottomless upper cup body comprising a bellied side wall substantially the same in both shape and size as the corresponding side wall of the lower body; said upper body swelling upwardly and outwardly from the radially inner edge of said ledge.

References Cited in the file of this patent

UNITED STATES PATENTS

| | | | |
|---|---|---|---|
| D. 17,426 | Brownfield | July 5, | 1887 |
| D. 24,238 | Butler | Apr. 23, | 1895 |
| D. 28,732 | Cook | May 31, | 1898 |
| D. 38,054 | Slater | June 5, | 1906 |
| D. 40,686 | Sanford | May 10, | 1910 |
| D. 74,401 | Venon | Feb. 7, | 1928 |
| D. 113,154 | Wellman | Jan. 31, | 1939 |
| D. 139,093 | Ganz | Oct. 10, | 1944 |
| 53,279 | Dithridge | Mar. 20, | 1866 |
| 93,734 | Morahan | Aug. 17, | 1869 |
| 146,078 | King | Dec. 30, | 1873 |
| 234,739 | Beattie | Nov. 23, | 1880 |
| 259,988 | Miller et al. | June 20, | 1882 |
| 298,244 | Shaw | May 6, | 1884 |
| 755,223 | Fenn | Mar. 22, | 1904 |
| 788,286 | Stebbins et al. | Apr. 25, | 1905 |
| 949,452 | Smith, Jr. | Feb. 15, | 1910 |
| 2,023,703 | Sehlbach | Dec. 10, | 1935 |
| 2,143,027 | Perry | Jan. 10, | 1939 |

FOREIGN PATENTS

| | | | |
|---|---|---|---|
| 17,810 | Great Britain | July 29, | 1897 |
| 238,013 | Great Britain | Aug. 10, | 1925 |